(12) United States Patent
Nielsen et al.

(10) Patent No.: US 9,909,472 B2
(45) Date of Patent: Mar. 6, 2018

(54) ENGINE SYSTEM WITH TURBULENCE ASSISTED DAMPING OF LOW FREQUENCY SOUND

(71) Applicant: VOLVO CAR CORPORATION, Gothenburg (SE)

(72) Inventors: Elise Nielsen, Gothenburg (SE); Pekka Saviharju, Ulricehamn (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 15/160,090

(22) Filed: May 20, 2016

(65) Prior Publication Data

US 2016/0341084 A1 Nov. 24, 2016

(30) Foreign Application Priority Data

May 20, 2015 (EP) ..................... 15168315

(51) Int. Cl.
*F02B 27/02* (2006.01)
*F01N 3/00* (2006.01)
(Continued)

(52) U.S. Cl.
CPC ............... *F01N 1/085* (2013.01); *F01N 1/00* (2013.01); *F01N 1/08* (2013.01); *F01N 3/021* (2013.01);
(Continued)

(58) Field of Classification Search
CPC .......... F01N 13/009; F01N 13/10; F01N 1/00; F01N 1/08; F01N 1/085; F01N 2260/14;
(Continued)

(56) References Cited

U.S. PATENT DOCUMENTS 4,006,793 A * 2/1977 Robinson ................. F01N 1/00
181/266
6,354,398 B1 * 3/2002 Angelo .................. F01N 1/006
181/256
(Continued)

FOREIGN PATENT DOCUMENTS

EP      2551483 A1    1/2013
WO   03050398 A1    6/2003

OTHER PUBLICATIONS

Extended European Search Report dated Nov. 10, 2015, Application No. 15168315.8-1606, Applicant Volvo Car Corporation, 6 Pages.

*Primary Examiner* — Phutthiwat Wongwian
*Assistant Examiner* — Diem Tran
(74) *Attorney, Agent, or Firm* — Brooks Kushman P.C.

(57) ABSTRACT

The present disclosure relates to an engine system comprising an ICE; an exhaust system; and an engine control unit for controlling operation of the engine system between at least a first operating state resulting in a first exhaust temperature range, and a second operating state resulting in a second, higher, exhaust temperature range. The exhaust system comprises a low frequency sound attenuation portion including a first tubing section having a first flow area; a second tubing section, having a second flow area smaller than the first flow area; and a third tubing section having a third flow area greater than the second flow area. The low frequency sound attenuation portion is dimensioned to achieve laminar flow through the third tubing section when the engine system is in the first operating state; and turbulent flow through the third tubing section when the engine system is in the second operating state.

9 Claims, 3 Drawing Sheets

(51) Int. Cl.
*F01N 3/02* (2006.01)
*F01N 1/08* (2006.01)
*F01N 3/10* (2006.01)
*F01N 9/00* (2006.01)
*F01N 3/021* (2006.01)
*F01N 1/00* (2006.01)
*F01N 3/025* (2006.01)
*F01N 3/027* (2006.01)
*F01N 13/00* (2010.01)
*F01N 13/10* (2010.01)

(52) U.S. Cl.
CPC .............. *F01N 3/025* (2013.01); *F01N 3/027* (2013.01); *F01N 3/0253* (2013.01); *F01N 3/103* (2013.01); *F01N 9/00* (2013.01); *F01N 13/009* (2014.06); *F01N 13/10* (2013.01); *F01N 2260/14* (2013.01); *F01N 2260/16* (2013.01); *F01N 2470/20* (2013.01); *F01N 2470/24* (2013.01); *F01N 2470/30* (2013.01); *F01N 2490/18* (2013.01); *F01N 2490/20* (2013.01); *F01N 2610/03* (2013.01); *Y02T 10/47* (2013.01)

(58) Field of Classification Search
CPC .............. F01N 2260/16; F01N 2470/20; F01N 2470/24; F01N 2470/30; F01N 2490/18; F01N 2490/20; F01N 3/021; F01N 3/025; F01N 3/0253; F01N 3/027; F01N 3/103; F01N 2610/03; F01N 9/00
USPC ............................................ 60/297, 311, 312
See application file for complete search history.

(56) References Cited

U.S. PATENT DOCUMENTS

2003/0121722 A1* 7/2003 Crombeen .............. F01N 1/089
 181/275
2005/0247051 A1* 11/2005 Wagner ................. F01N 13/011
 60/287

* cited by examiner

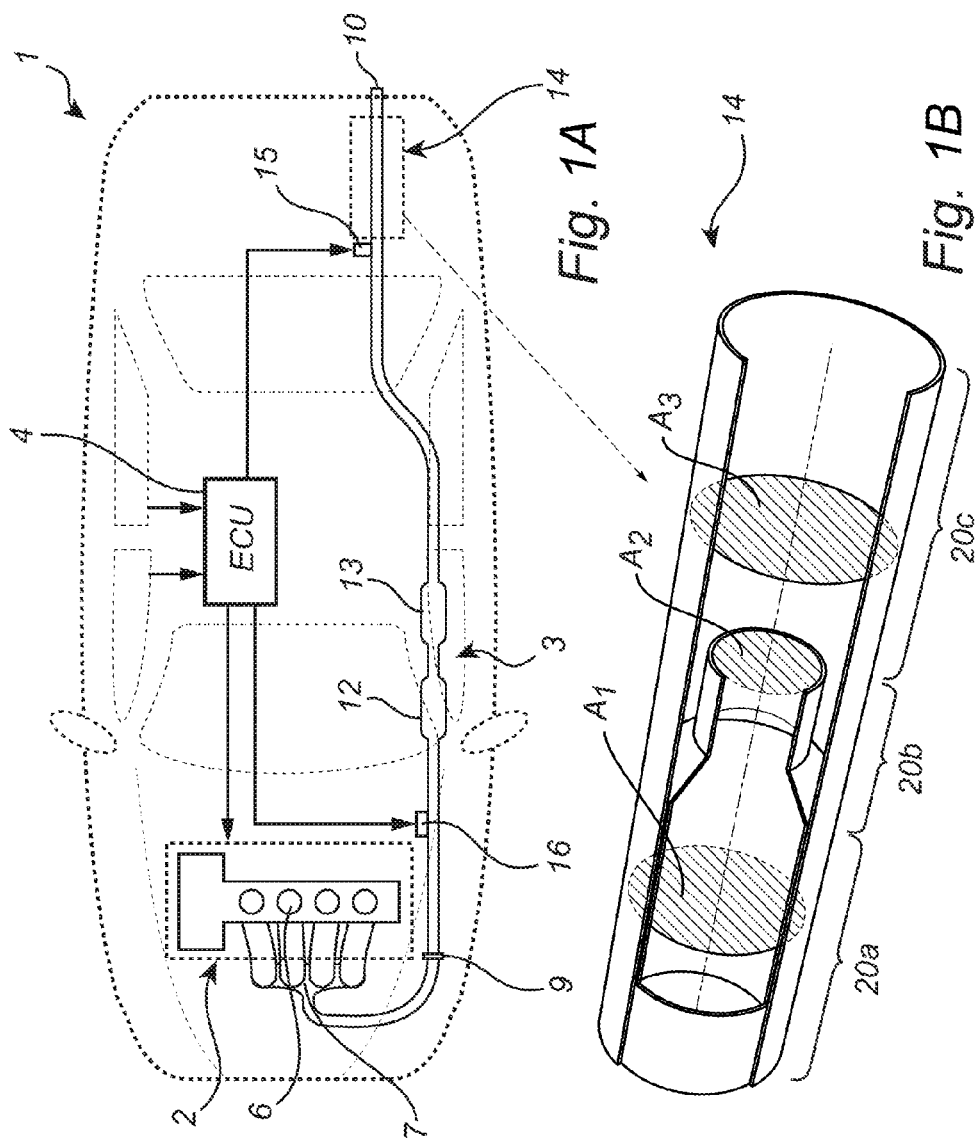

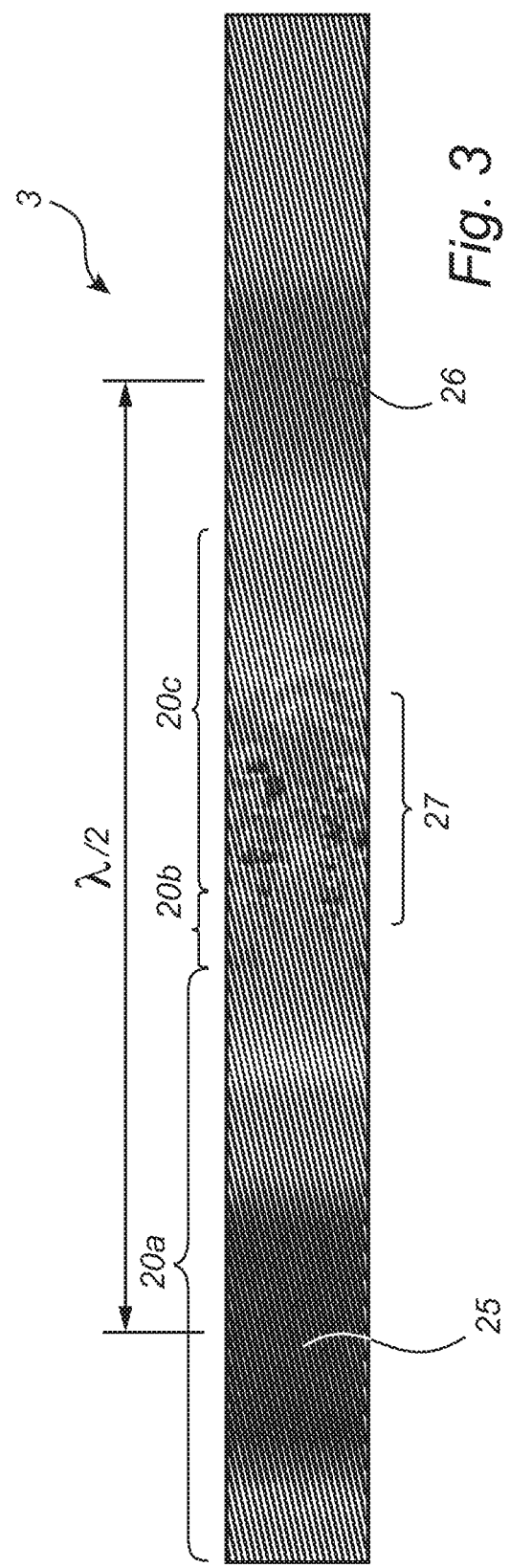

ENGINE SYSTEM WITH TURBULENCE ASSISTED DAMPING OF LOW FREQUENCY SOUND

CROSS-REFERENCE TO RELATED APPLICATIONS

This application claims foreign priority benefits under 35 U.S.C. §119(a)-(d) to European patent application number EP 15168315.8, filed May 20, 2015, which is incorporated by reference in its entirety.

TECHNICAL FIELD

The present disclosure relates to an engine system for a vehicle, comprising an exhaust system having a low frequency sound attenuation portion.

BACKGROUND

Vehicles, such as passenger cars, powered by an internal combustion engine (ICE) are generally provided with an exhaust system for conducting exhaust fumes from the ICE to the atmosphere at a suitable location. In addition to conducting the exhaust fumes, the exhaust system typically also performs additional functions, such as processing the exhaust fumes for preventing unwanted emissions and reducing engine-related sounds emitted from the vehicle.

Regarding the emission of sounds from the vehicle, there are regulations that should be complied with, and the users of the vehicle should also not be exposed to types of sound and/or sound levels that may be perceived as uncomfortable or unpleasant. This task of sound suppression may be complicated by new operating regimes for the ICE that may, for example, be introduced in order to reduce unwanted emissions.

In addition, vehicle manufacturers are always striving for more efficient use of resources and cost reductions, for instance in the form of exhaust systems using less material for achieving the desired functionalities.

Accordingly, it would be desirable to provide an improved engine system. In particular, it would be desirable to provide an engine system comprising a more compact exhaust system that is still capable of sufficiently reducing unpleasant sounds even for new operating regimes for the ICE.

SUMMARY

In view of above-mentioned and other drawbacks of the prior art, it is an object of the present disclosure to provide an improved engine system, in particular comprising a more compact exhaust system that is still capable of sufficiently reducing unpleasant sounds.

According to the present disclosure, it is therefore provided an engine system comprising: an internal combustion engine having at least one combustion chamber and an exhaust manifold for conducting exhaust fumes away from the at least one combustion chamber; an exhaust system forming a flow path between an inlet in fluid flow connection with the exhaust manifold and an outlet; and an engine control unit for controlling operation of the engine system between at least a first operating state resulting in a first exhaust fume temperature range, and a second operating state resulting in a second exhaust fume temperature range, substantially higher than the first exhaust fume temperature range, wherein the flow path of the exhaust system comprises a low frequency sound attenuation portion including: a first tubing section having a first flow area; a second tubing section, directly downstream the first tubing section, having a second flow area smaller than the first flow area; and a third tubing section, directly downstream the second tubing section, having a third flow area greater than the second flow area, wherein the first, second and third tubing sections are dimensioned in such a way that: a flow of the exhaust fumes through the third tubing section is laminar when the engine system is controlled by the engine control unit to be in the first operating state; and the flow of the exhaust fumes through the third tubing section is turbulent when the engine system is controlled by the engine control unit to be in the second operating state.

In one embodiment, a low end of the second exhaust fume temperature range may be at least 50% higher than a low end of the first exhaust fume temperature range and/or a high end of the second exhaust fume temperature range may be at least 50% higher than a high end of the first exhaust fume temperature range. For example, the first exhaust fume temperature range may be 200° C. to 400° C. and the second exhaust fume temperature range may be 300° C. to 600° C. In another embodiment, the low end of the second exhaust fume temperature range may be at least 100% higher than the low end of the first exhaust fume temperature range and/or the high end of the second exhaust fume temperature range may be at least 100% higher than the high end of the first exhaust fume temperature range. For example, the first exhaust fume temperature range may be 200° C. to 450° C. and the second exhaust fume temperature range may be 400° C. to 900° C. In yet another embodiment, the first exhaust fume temperature range may be less than 400° C. and the second exhaust fume temperature range may be greater than 450° C. The above minimum temperatures may be present by a tailpipe outlet, and the above maximum temperatures may be present downstream of a particle filter during regeneration of the particle filter.

It should be understood that each of the first, second and third flow areas may be a minimum flow area, which defines the flow resistance through its respective tubing section.

The first operating state and the second operating state may, furthermore, result in substantially different temperature ranges for the exhaust fumes when the internal combustion engine (ICE) is operating at or around the same rpm (revolutions per minute). For instance, the first operating state may correspond to normal cruising with a relatively low and steady rpm. The second operating state may, for example, be an operating state with substantially the same rpm as the first operating state, but with a considerably elevated temperature of the exhaust fumes, at least when the exhaust fumes reach the low frequency attenuation portion of the exhaust system comprised in the engine system according to embodiments of the present disclosure.

Consider, for example, a vehicle with a particle filter for capturing particulate matter (soot) in the exhaust fumes. With the build-up of captured particles in the particle filter, the pressure drop across the particle filter increases, which in turn creates a counter pressure for the ICE, reducing the efficiency of the engine system. To prevent this undesirable situation, it is well known that the particle filter needs to be regenerated (particulate matter needs to be removed) from time to time. This is generally done by oxidizing the particulate matter using catalyzed or uncatalyzed oxidation. Regardless of which oxidation mechanism is used, there has to be a certain temperature in the particle filter for the desired oxidation reaction to take place. Therefore, at least the exhaust fumes present downstream such a particle filter will have a considerably elevated temperature during particle filter regeneration, as compared to normal driving.

Even if the mass flow of exhaust fumes from the ICE through the exhaust system may be substantially the same in the first operating state as in the second operating state, the elevated temperature in the second operating state will result in a substantially higher flow speed (volume per unit time) in the second operating state.

The present inventors have found that such an increase in flow speed, in particular in combination with a relatively low rpm of the ICE may result in loud low frequency sounds that may be perceived as disturbing.

The natural solution to this problem would be to introduce a conventional silencer arrangement tuned for removing low frequency sounds. This, however, adds weight and cost to the vehicle.

However, the present inventors have realized that the combination of rather low flow speeds through the exhaust system during normal driving conditions (with relatively low temperature exhaust fumes) and considerably higher flow speeds through the exhaust system in special operating states (with considerably higher temperature exhaust fumes) allows for the use of induced turbulence as a sound damping mechanism.

In particular, the present inventors have found that a low frequency sound attenuation portion can be formed, which provides for laminar flow at flow speeds corresponding to most normal driving conditions, and for turbulent flow at elevated flow speeds resulting from a considerably elevated temperature of the exhaust fumes.

A fluid flow may be classified as laminar or turbulent based on the value of the Reynold's number for the particular flow situation, where Re < about 2300 may be classified as laminar flow, and Re > about 4000 may be classified as turbulent flow.

The suitable configuration of the first, second and third tubing sections may vary from engine system to engine system depending on various parameters, such as ICE properties, the configuration of the rest of the exhaust system, the oxidation method used for regeneration of the particle filter (for embodiments of the engine system comprising a particle filter) etc. Therefore, it is not possible to generally specify exact dimensions for the first, second and third tubing sections of the low frequency sound attenuation portion of the exhaust system.

Based on known or easily measurable properties of the exhaust fumes, it will, however, be straight-forward for the skilled person to dimension the first, second and third tubing sections to provide for the desired laminar flow for the first operating state (which may correspond to normal, low power driving), and the desired turbulent flow for the second operating state (which may correspond to particle filter regeneration) with a considerably elevated temperature of the exhaust fumes.

Through the provision of the low frequency sound attenuation portion according to embodiments of the present disclosure, it has been found that it will be possible to reduce or even remove traditional mufflers, depending on desired engine performance and noise comfort levels. Hereby, space, cost and weight can be saved while still achieving the desired sound levels, even in special operating conditions, such as during particle filter regeneration.

According to various embodiments of the engine system of the present disclosure, the second tubing section may advantageously exhibit a gradually decreasing flow area, as seen from the first tubing section towards the third tubing section. Hereby, the risk of unwanted turbulence can be reduced.

Furthermore, to provide for the desired turbulence for sufficiently high temperatures (resulting in sufficiently high flow speeds through the second tubing section), there may be an abrupt transition from the second flow area of the second tubing section to the third flow area of the third tubing section. For instance, the increase in flow area from the second (minimum) flow area to the third flow area may take place over a distance of less than 10 mm, preferably less than 5 mm and even more preferably less than 2 mm.

This will provide for a sudden pressure drop downstream the second tubing section, which will in turn reduce the flow speed for which turbulence occurs.

In order not to disturb the turbulence formed in the third tubing section in the second operating state, the third tubing section may advantageously be straight along at least 100 mm directly downstream from the second tubing section. This will provide for improved attenuation of low frequency sounds.

As was also mentioned above, embodiments of the engine system of the present disclosure may further comprise a particle filter arranged upstream the low frequency sound attenuation portion.

Moreover, the second operating state may be a regeneration state for oxidation of particulate matter in the particle filter.

Furthermore, the low frequency sound attenuation portion of the exhaust system may be configured to provide laminar flow for a given rpm of the ICE, when the temperature in the first tubing section is below 200° C., and turbulent flow when the temperature in the first tubing section is above 300° C.

According to various embodiments, the exhaust system may further comprise a controllable valve arranged upstream the second tubing section.

The engine control unit may further be configured to control operation of the engine system to a third operating state with a higher output power from the internal combustions engine than in each of the first and second operating states; and the engine control unit may be connected to the controllable valve for opening the controllable valve in the third operating state to allow the exhaust fumes to at least partly bypass the second tubing section.

In a third, high power operating state, an increased flow speed may occur mainly due to increased rpm (and not increased temperature). To prevent unwanted loss of power of the engine system in such a situation, the ECU may be configured to open the controllable valve to reduce the counter pressure of the exhaust system.

In summary, according to various embodiments the present disclosure relates to an engine system comprising an ICE; an exhaust system; and an engine control unit for controlling operation of the engine system between at least a first operating state resulting in a first exhaust temperature range, and a second operating state resulting in a second, higher, exhaust temperature range. The exhaust system comprises a low frequency sound attenuation portion including a first tubing section having a first flow area; a second tubing section, having a second flow area smaller than the first flow area; and a third tubing section having a third flow area greater than the second flow area. The low frequency sound attenuation portion is dimensioned to achieve laminar flow through the third tubing section when the engine system is in the first operating state; and turbulent flow through the third tubing section when the engine system is in the second operating state.

BRIEF DESCRIPTION OF THE DRAWINGS

These and other aspects of the present disclosure will now be described in more detail, with reference to the attached drawings showing an example embodiment of the disclosure FIGS. 1A-B schematically show an engine system according to an example embodiment of the present disclosure;

FIG. 3 schematically illustrates the sound attenuation mechanism of the low frequency sound attenuation portion comprised in the engine system in FIGS. 1A-B.

DETAILED DESCRIPTION

Figure 2A:
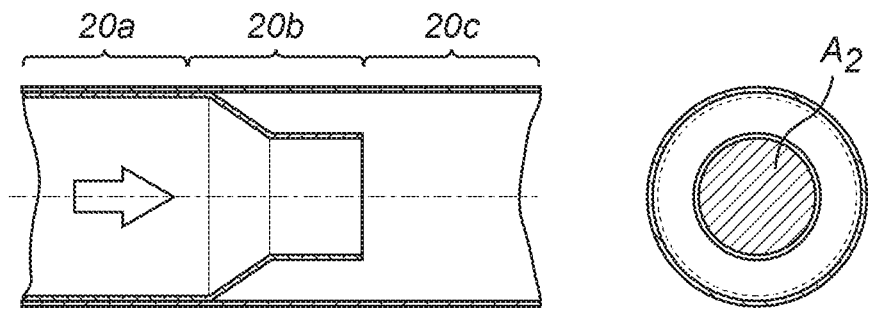
FIGS. 2A-C schematically show different partial configurations of the low frequency sound attenuation portion comprised in the engine system in FIGS. 1A-B.

As required, detailed embodiments are disclosed herein; however, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

FIGS. 1A-B schematically show an engine system 1 according to an example embodiment of the present disclosure. Referring first to FIG. 1A, the engine system 1 comprises an internal combustion engine (ICE) 2, an exhaust system 3, and an engine control unit (ECU) 4 for controlling operation of the engine system 1.

The ICE 2, which may be a diesel engine or a gasoline engine for example, comprises at least one combustion chamber 6 (generally one combustion chamber per cylinder for an ICE comprising cylinders), and an exhaust manifold 7. Combustion in the combustion chamber results in exhaust fumes, which are evacuated from the combustion chamber 6 into the exhaust manifold 7.

The exhaust system 3 forms a flow path for the evacuated exhaust fumes, from an inlet 9 connected to the exhaust manifold 7 to an outlet 10, often referred to as the tailpipe, of the exhaust system 3. In the example embodiment shown in FIG. 1A, the exhaust system 3 further comprises a catalytic converter 12, a particle filter 13 arranged downstream from the catalytic converter, a low frequency sound attenuation portion 14 arranged downstream from the particle filter 13, and a controllable valve 15 provided along the flow path between the particle filter 13 and the low frequency sound attenuation portion 14. In the presently illustrated example embodiment, the engine system 1 further comprises an exhaust fume heater 16 arranged between the inlet 9 and the particle filter 13. The exhaust fume heater 16 may be any arrangement suitable for increasing the temperature of the exhaust fumes from the ICE. For instance, the exhaust fume heater 16 may be an electric heater, or an injector for injecting hydrocarbon into the flow path of the exhaust system. In the latter case, combustion of the injected hydrocarbon (such as ICE fuel) will considerably increase the temperature of the exhaust fumes downstream from the exhaust fume heater 16.

With continued reference to FIG. 1A, the ECU 4 controls operation of the engine system 1 based on input signals and a predefined set of instructions. To that end, the ECU 4 typically comprises processing circuitry, such as one or several microprocessors, and memory (e.g., storage device including computer readable program instructions that are executable by the one or more microprocessors so that the ECU may perform particular algorithms represented by the functions and/or operations described herein) although this is not explicitly shown in FIG. 1A. Based on input signals from sensors and driver operated actuators and/or autonomous driving control signals, the ECU 4 may thus, as is schematically shown in FIG. 1A, control operation of the ICE 2, the controllable valve 15 and the exhaust fume heater 16, etc. In FIG. 1A, the ECU 4 is schematically indicated as controlling the ICE 2, the controllable exhaust bypass valve 15 and the exhaust fume heater 16 through separate outputs. It should, however, be understood that communication between the ECU 4 and the various sensor, and actuators, etc., in the engine system 1 may advantageously take place over a communication bus, such as the well-known CAN bus.

As is indicated in FIG. 1A, the exemplary exhaust system 3 lacks a traditional muffler or silencer between the particle filter 13 and the outlet 10 of the exhaust system 4. The necessary sound attenuation is instead provided by the low frequency sound attenuation portion 14. This low frequency sound attenuation portion of the flow path of the exhaust system 3 will now be described in greater detail with reference to FIG. 1B.

Referring to FIG. 1B, the low frequency sound attenuation portion 14 comprises a first tubing section 20a having a first flow area A1, a second tubing section 20b having a second flow area A2, and a third tubing section 20c having a third flow area A3.

For a given rpm range, the tubing sections 20a c are dimensioned to provide a relatively small added counter pressure and laminar flow through the low frequency sound attenuation portion 14 for exhaust fume temperatures in a first relatively low temperature range (e.g., 200° C. to 450° C.), and to provide turbulence in the third tubing section 20c for exhaust fume temperatures in a second relatively high temperature range (e.g., 400° C. to 900° C.).

When the exhaust fume temperature is increased for a given mass flow rate, then the flow speed will increase proportionally to the temperature increase. As is, per se, known, an abrupt transition in flow area from a small flow area to a larger flow area need not result in turbulence for very low flow speeds, but will result in turbulence downstream the transition for higher flow speeds. Whether the flow in the third tubing section 20c will be laminar or turbulent for a given flow speed at the transition between the second tubing section 20b and the third tubing section 20c would be straight-forward to simulate numerically, and is also possible to test, for example using a transparent scale model of the low frequency sound attenuation portion 14 of the exhaust system 3.

As will be described further below, passing a sound wave through turbulence will result in irreversible conversion of low frequency energy components to high frequency energy components. To increase the efficiency of this conversion, the present inventors have found that it would be advantageous with an undisturbed turbulent section that is sufficiently long to absorb enough low frequency energy from a sound wave traveling along the flow path of the exhaust system 3. In particular, the present inventors have found that the third tubular section should at least comprise a 100 mm long section that is substantially straight.

As mentioned above, it is mainly the configuration of the transition from the second flow area to the third flow area that determines if the exhaust fume flow in the third tubular section will be turbulent or not for a given flow speed. With that in mind, it can be appreciated that the second tubular section can be configured in various ways, as long as a suitable transition from the second flow area to the third flow area is achieved.

Figure 2B:
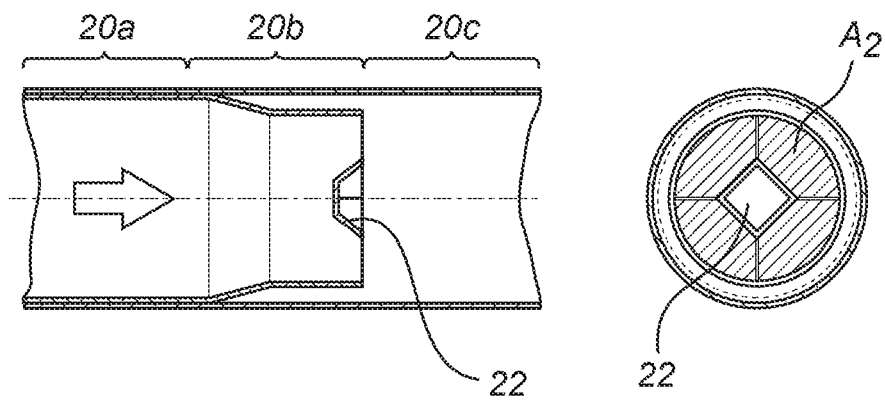
Figure 2C:
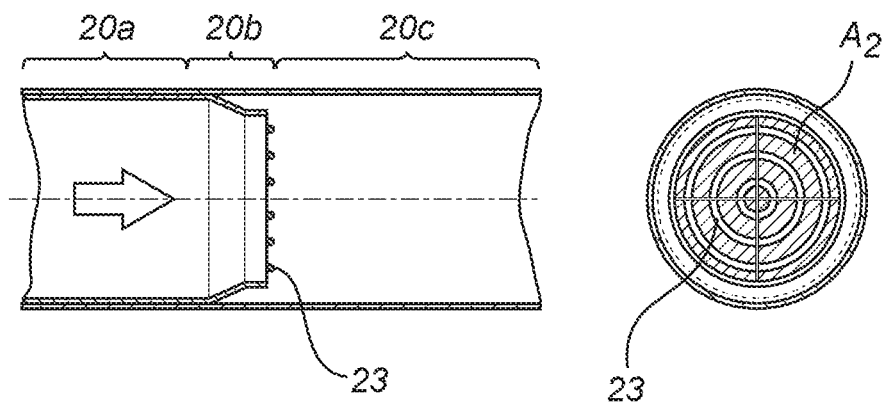

Three of many possible configurations of the second tubing section are schematically shown in FIGS. 2A-C.

Referring first to FIG. 2A, a pipe diameter restriction has been introduced, providing a gradual decrease in flow area from the first flow area A1 to the second flow area A2, and then an abrupt increase in flow area from the second flow area A2 to the third flow area A3.

Turning then to FIG. 2B, the reduction in flow area to the second flow area A2 is provided by arranging a flow restricting member 22 in the center of the flow path through the second tubing section 20b.

Finally, in FIG. 2C, the reduction in flow area to the second flow area A2 is provided by arranging concentric rings 23 in the flow path through the second tubing section 20b.

FIG. 3 is an illustration of a numerical simulation showing the effectiveness of turbulence for damping low frequency sound. In FIG. 3, the darker an area is, the higher the pressure is in that area. Referring to FIG. 3, there is a first pressure maximum 25, with a relatively high pressure, upstream of the second tubing section 20b, and a second pressure maximum 26 with a lower pressure, downstream of the second tubing section 20b. Between the first pressure maximum 25 and the second pressure maximum 26, the sound wave has lost energy when passing through the turbulent section 27 directly downstream from the second tubing portion 20b.

The person skilled in the art realizes that the present disclosure by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

While exemplary embodiments are described above, it is not intended that these embodiments describe all possible forms according to the disclosure. The words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. An engine system comprising:
an internal combustion engine having at least one combustion chamber and an exhaust manifold for conducting exhaust fumes away from the at least one combustion chamber;
an exhaust system forming a flow path between an inlet in fluid flow connection with the exhaust manifold and an outlet; and
an engine control unit for controlling operation of the engine system between at least a first operating state resulting in a first exhaust fume temperature range for a given revolutions per minute (rpm), and a second operating state resulting in a second exhaust fume temperature range for the given rpm higher than the first exhaust fume temperature range;
wherein the flow path of the exhaust system comprises a low frequency sound attenuation portion including:
a first tubing section having a first flow area;
a second tubing section, directly downstream of the first tubing section, having a second flow area smaller than the first flow area; and
a third tubing section, directly downstream of the second tubing section, having a third flow area greater than the second flow area;
wherein the first, second and third tubing sections are dimensioned in such a way that:
a flow of the exhaust fumes through the third tubing section is laminar when the engine system is controlled by the engine control unit to be in the first operating state; and
the flow of the exhaust fumes through the third tubing section is turbulent when the engine system is controlled by the engine control unit to be in the second operating state; wherein the first temperature range in the first tubing section is below 200° C., and the second temperature range in the first tubing section is above 300° C.

2. The engine system according to claim 1 wherein the second tubing section exhibits a gradually decreasing flow area, as seen from the first tubing section towards the third tubing section.

3. The engine system according to claim 1 wherein:
the third flow area is greater than the second flow area; and there is an abrupt transition from the second flow area to the third flow area.

4. The engine system according to claim 1 wherein the third tubing section is straight along at least 100 mm directly downstream from the second tubing section.

5. The engine system according to claim 1 wherein the exhaust system further comprises a particle filter arranged upstream the low frequency sound attenuation portion.

6. The engine system according to claim 5 wherein the second operating state is a regeneration state for oxidation of particulate matter in the particle filter.

7. The engine system according to claim 1 wherein the exhaust system further comprises a controllable valve arranged upstream of the second tubing section.

8. The engine system according to claim 7 wherein:
the engine control unit is further configured to control operation of the engine system to a third operating state with a higher output power from the internal combustion engine than in each of the first and second operating states; and
the engine control unit is connected to the controllable valve for opening the controllable valve in the third operating state to allow the exhaust fumes to at least partly bypass the second tubing section.

9. The engine system according to claim 1 wherein the internal combustion engine is a diesel engine.

* * * * *